US012695730B2

(12) United States Patent
Grammel et al.

(10) Patent No.: US 12,695,730 B2
(45) Date of Patent: Jul. 28, 2026

(54) UTILIZING A REMOVABLE QUANTUM RANDOM NUMBER GENERATOR FOR A NETWORK DEVICE

(71) Applicant: Juniper Networks, Inc., Sunnyvale, CA (US)

(72) Inventors: Gert Grammel, Ditzingen (DE); Jason R. Pascucci, Milford, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 190 days.

(21) Appl. No.: 17/662,482

(22) Filed: May 9, 2022

(65) Prior Publication Data

US 2023/0362137 A1　Nov. 9, 2023

(51) Int. Cl.
　*H04L 9/08*　　(2006.01)
　*H04L 9/40*　　(2022.01)
　*H04L 45/50*　　(2022.01)
　*H04L 45/74*　　(2022.01)

(52) U.S. Cl.
　CPC .......... *H04L 63/0428* (2013.01); *H04L 45/50* (2013.01); *H04L 45/74* (2013.01)

(58) Field of Classification Search
　CPC ..... H04L 63/0428; H04L 45/50; H04L 45/74; H04L 9/0852; H04L 9/40; H04L 9/0662; G06F 7/588; G06F 7/58
　See application file for complete search history.

(56) References Cited

U.S. PATENT DOCUMENTS

| | | | | |
|---|---|---|---|---|
| 5,365,551 | A * | 11/1994 | Snodgrass | G06K 7/0008 380/34 |
| 6,091,742 | A * | 7/2000 | Bassat | H04N 21/4344 375/E7.278 |
| 6,122,280 | A * | 9/2000 | Hamai | H04L 12/40058 370/476 |
| 6,202,081 | B1 * | 3/2001 | Naudus | H04L 63/029 709/200 |
| 6,292,096 | B1 * | 9/2001 | Munch | B60C 23/0433 340/447 |

(Continued)

FOREIGN PATENT DOCUMENTS

| | | |
|---|---|---|
| CN | 106899402 A | 6/2017 |
| CN | 214591472 U | 11/2021 |

(Continued)

OTHER PUBLICATIONS

J. Matošuek and P. Korček, "Precise IPV4/IPV6 packet generator based on NetCOPE platform," 14th IEEE International Symposium on Design and Diagnostics of Electronic Circuits and Systems, Cottbus, Germany, 2011, pp. 319-324, doi: 10.1109/DDECS 2011. 5783104. (Year: 2011).*

(Continued)

*Primary Examiner* — Dhairya A Patel
*Assistant Examiner* — Vinh Nguyen
(74) *Attorney, Agent, or Firm* — Harrity & Harrity, LLP

(57) ABSTRACT

A removable quantum random number generator (QRNG) of a network device may generate one or more packets with random payloads, and may provide the one or more packets with the random payloads to a component of the network device. The component of the network device may cause the one or more packets with the random payloads to be forwarded to a destination address.

20 Claims, 10 Drawing Sheets

500 ➘

510 ～ Generate, by a removable quantum random number generator (QRNG) of a network device, one or more packets with random payloads 520 ～ Provide, by the removable QRNG, the one or more packets with the random payloads to a component of the network device 530 ～ Cause, by the component, the one or more packets with the random payloads to be forwarded to a destination address

(56) References Cited

U.S. PATENT DOCUMENTS

| | | | | |
|---|---|---|---|---|
| 6,751,228 | B1 * | 6/2004 | Okamura | H04L 12/403 |
| | | | | 370/516 |
| 7,269,730 | B2 * | 9/2007 | Stirbu | H04L 9/3271 |
| | | | | 713/160 |
| 7,570,667 | B1 * | 8/2009 | Ferguson | H04J 3/1617 |
| | | | | 370/506 |
| 7,961,630 | B2 * | 6/2011 | Erickson | H04L 47/621 |
| | | | | 370/241 |
| 8,250,127 | B2 * | 8/2012 | Kelly | H04L 9/0662 |
| | | | | 708/250 |
| 8,595,818 | B2 * | 11/2013 | Karlin | H04L 63/0281 |
| | | | | 713/150 |
| 9,357,002 | B1 * | 5/2016 | Roskind | H04L 63/1466 |
| 9,967,183 | B2 * | 5/2018 | Ashwood-Smith | H04L 45/34 |
| 10,338,890 | B1 * | 7/2019 | Anderson | G06F 7/588 |
| 10,372,528 | B1 * | 8/2019 | Anderson | G06F 21/00 |
| 10,785,021 | B1 * | 9/2020 | Prabhat | H04L 9/0863 |
| 11,076,025 | B1 * | 7/2021 | Volpe | H04L 43/106 |
| 11,240,671 | B1 * | 2/2022 | Huang | H04W 76/14 |
| 11,388,078 | B1 * | 7/2022 | Sommers | H04L 43/50 |
| 11,895,232 | B1 * | 2/2024 | Stapleton | H04L 9/0861 |
| 12,034,834 | B1 * | 7/2024 | Tatarkiewicz | H04L 9/0869 |
| 12,095,911 | B2 * | 9/2024 | Paik | H04L 9/0869 |
| 2003/0131156 | A1 * | 7/2003 | Aizu | H04B 3/54 |
| | | | | 710/1 |
| 2003/0200433 | A1 * | 10/2003 | Stirbu | H04L 9/0844 |
| | | | | 713/169 |
| 2005/0094637 | A1 * | 5/2005 | Umesawa | H04L 41/0893 |
| | | | | 370/389 |
| 2005/0160269 | A1 * | 7/2005 | Akimoto | H04L 63/0272 |
| | | | | 713/171 |
| 2006/0067527 | A1 * | 3/2006 | Urivskiy | G06F 7/588 |
| | | | | 380/46 |
| 2006/0256720 | A1 | 11/2006 | Curran-Gray et al. | |
| 2007/0140254 | A1 * | 6/2007 | Tuppa | H04L 47/22 |
| | | | | 370/442 |
| 2007/0162740 | A1 * | 7/2007 | Relan | H04L 63/0428 |
| | | | | 713/153 |
| 2007/0233847 | A1 * | 10/2007 | Aldereguia | H04L 43/50 |
| | | | | 709/224 |
| 2008/0005354 | A1 * | 1/2008 | Kryskow | H04L 65/80 |
| | | | | 709/238 |
| 2009/0086749 | A1 * | 4/2009 | Erickson | H04L 47/564 |
| | | | | 370/415 |
| 2010/0002877 | A1 * | 1/2010 | Zhang | H04L 9/0662 |
| | | | | 380/46 |
| 2010/0046553 | A1 * | 2/2010 | Daigle | G06F 21/46 |
| | | | | 370/474 |
| 2011/0035589 | A1 * | 2/2011 | Butcher | G06F 21/1078 |
| | | | | 713/168 |
| 2011/0044357 | A1 * | 2/2011 | Shtern | H04L 69/28 |
| | | | | 370/516 |
| 2011/0244798 | A1 * | 10/2011 | Daigle | G06Q 30/0226 |
| | | | | 455/41.2 |
| 2012/0092133 | A1 * | 4/2012 | Uchida | G06K 7/10059 |
| | | | | 340/10.1 |
| 2012/0311691 | A1 * | 12/2012 | Karlin | H04L 63/0281 |
| | | | | 726/12 |

| | | | | |
|---|---|---|---|---|
| 2014/0201253 | A1 * | 7/2014 | Chu | G06F 7/582 |
| | | | | 708/250 |
| 2014/0304810 | A1 * | 10/2014 | Khanal | H04L 63/1466 |
| | | | | 726/22 |
| 2015/0180771 | A1 * | 6/2015 | Ashwood-Smith | |
| | | | | H04L 45/566 |
| | | | | 370/392 |
| 2015/0229471 | A1 * | 8/2015 | Nair | H04L 9/0891 |
| | | | | 713/171 |
| 2016/0134306 | A1 * | 5/2016 | Sugimoto | H03M 13/2789 |
| | | | | 714/776 |
| 2017/0083917 | A1 * | 3/2017 | Sjoholm | G06Q 20/4014 |
| 2017/0357940 | A1 * | 12/2017 | Radhakrishnan | G06Q 10/0875 |
| 2018/0017946 | A1 * | 1/2018 | Kyou | G04R 20/26 |
| 2018/0212872 | A1 * | 7/2018 | Zhuang | H04L 41/00 |
| 2018/0244238 | A1 * | 8/2018 | Shah | H04L 9/0825 |
| 2018/0295555 | A1 * | 10/2018 | Xiong | H04L 47/267 |
| 2018/0341307 | A1 * | 11/2018 | Shaikh | G06F 1/3203 |
| 2018/0375650 | A1 | 12/2018 | Legre | |
| 2019/0036689 | A1 * | 1/2019 | Schiffman | H04L 9/0861 |
| 2019/0347075 | A1 * | 11/2019 | Kim | G06F 7/588 |
| 2020/0007507 | A1 * | 1/2020 | Zhu | H04L 47/748 |
| 2020/0007517 | A1 | 1/2020 | Spahn et al. | |
| 2020/0366652 | A1 * | 11/2020 | Koyun | H04L 63/045 |
| 2021/0085988 | A1 * | 3/2021 | Nin | G06F 21/629 |
| 2021/0105022 | A1 * | 4/2021 | Flynn | H03M 7/6011 |
| 2021/0111992 | A1 * | 4/2021 | Nainar | H04L 45/24 |
| 2021/0119921 | A1 * | 4/2021 | Xie | H04L 45/24 |
| 2021/0119978 | A1 * | 4/2021 | Nath | H04L 9/0877 |
| 2021/0194876 | A1 * | 6/2021 | Kasahara | H04B 7/15 |
| 2022/0353071 | A1 * | 11/2022 | Jeong | G06N 10/60 |
| 2022/0368529 | A1 * | 11/2022 | Roy | H04L 9/088 |
| 2023/0269077 | A1 * | 8/2023 | Syrivelis | H04L 63/205 |
| | | | | 713/171 |
| 2023/0362137 | A1 | 11/2023 | Grammel et al. | |

FOREIGN PATENT DOCUMENTS

| | | | | |
|---|---|---|---|---|
| EP | 4277196 A1 | 11/2023 | | |
| WO | WO-2019076452 A1 * | 4/2019 | | H04L 9/0656 |
| WO | 2021/054734 A1 | 3/2021 | | |

OTHER PUBLICATIONS

Extended European Search Report for Application No. EP22180778.7 mailed on Dec. 7, 2022, 8 pages.

Paraiso et al., "A Photonic Integrated Quantum Secure Communication System," Nature Photonics, Nature Publishing Group, vol. 15(11), Oct. 2021, pp. 850-856, XP037601127, ISSN: 17 49-4885, DOI: 10.1 038/S41566-021-00873-0 [retrieved on Oct. 21, 2021].

"Quantis QRNG Chip—ID Quantique," Website: https://www.idquantique.com/random-number-generation/products/quantis-qrng-chip/, Obtained Mar. 23, 2022, 4 Pages.

"Understanding the Juniper Entropy Beacon," Website: https://www.juniper.net/documentation/en_US/junos/topics/ topic-map/juniper-entropy-beacon.html, Obtained Mar. 23, 2022, 5 Pages.

"A Guide to a Quantum-Safe Organization", Dec. 2021, 18 pages.

Liu et al., "502 Gbits/s quantum random number generation with simple and compact structure", 2016, 3 pages.

* cited by examiner

110
Generate packets with random payloads and provide the packets
to the packet forwarding component and/or the routing component Packet
forwarding
component Routing
component Removable
QRNG Network
device

100

120

Cause the packets with the random payloads to be forwarded to a destination address Endpoint device Network device Network Network device Network device Routing component Packet forwarding component Removable QRNG Endpoint device

100

125 Provide the packets with the random payloads, via encryption, to other network devices

500

510   Generate, by a removable quantum random number generator (QRNG) of a network device, one or more packets with random payloads 520   Provide, by the removable QRNG, the one or more packets with the random payloads to a component of the network device 530   Cause, by the component, the one or more packets with the random payloads to be forwarded to a destination address

UTILIZING A REMOVABLE QUANTUM RANDOM NUMBER GENERATOR FOR A NETWORK DEVICE

BACKGROUND

Network security is the process of taking physical and software preventative measures to protect a network infrastructure from unauthorized access, misuse, malfunction, modification, destruction, improper disclosure, and/or the like. Network security creates a secure platform infrastructure for computing devices, users, software programs, and/or the like to perform functions within a secure environment.

SUMMARY

Some implementations described herein relate to a method. The method may include generating, by a removable quantum random number generator (QRNG) of a network device, one or more packets with random payloads, and providing, by the removable QRNG, the one or more packets with the random payloads to a component of the network device. The method may include causing, by the component, the one or more packets with the random payloads to be forwarded to a destination address.

Some implementations described herein relate to a network device. The network device may include a removable QRNG, one or more memories, and one or more processors. The one or more processors may be configured to generate, by the removable QRNG, one or more packets with random payloads, and provide, by the removable QRNG, the one or more packets with the random payloads to a component of the network device. The one or more processors may be configured to cause, by the component, the one or more packets with the random payloads to be forwarded to a destination address.

Some implementations described herein relate to a non-transitory computer-readable medium that stores a set of instructions for a network device. The set of instructions, when executed by one or more processors of the network device, may cause the network device to generate, by a removable QRNG of the network device, one or more packets with random payloads, and provide, by the removable QRNG, the one or more packets with the random payloads to a component of the network device. The set of instructions, when executed by one or more processors of the network device, may cause the network device to authenticate the random payloads of the one or more packets, cause, by the component, the one or more packets with the random payloads to be forwarded to a destination address.

DETAILED DESCRIPTION

Figure 1A:
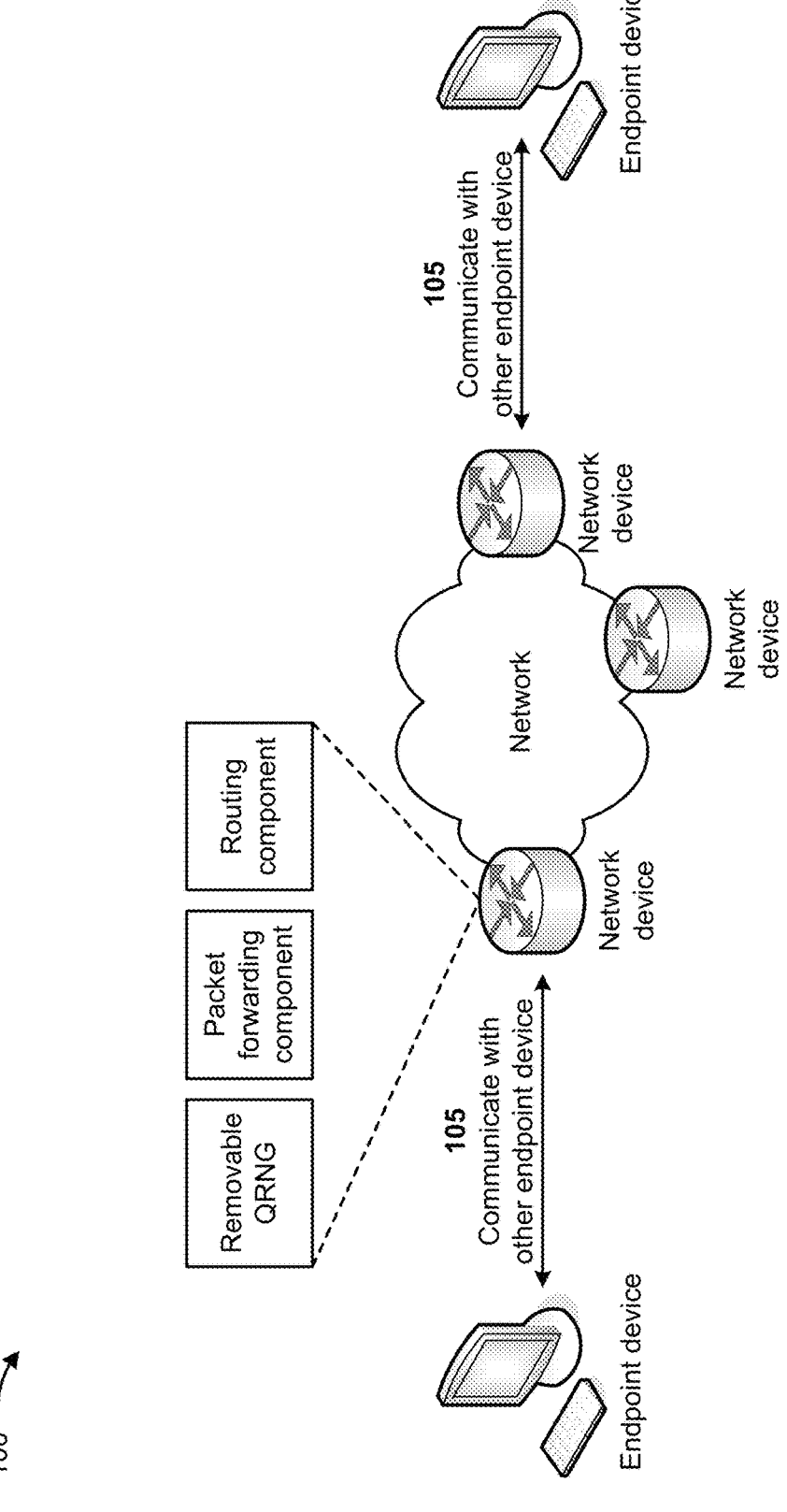
FIGS. 1A-1F are diagrams of an example associated with utilizing a removable QRNG for a network device.

The following detailed description of example implementations refers to the accompanying drawings. The same reference numbers in different drawings may identify the same or similar elements.

A superior source of randomness (or cryptographic entropy) may be utilized to provide superior network and data security. A cryptographic system may use a source of entropy for generating cryptographic materials (e.g., as keys, during certificate generation, for key derivation, or as parts of encryption or decryption algorithms). Part of the effectiveness of a cryptographic system may be determined based on strengths (e.g., unpredictability, independence, uniformity of statistical distribution, and/or the like) of the entropy utilized by the cryptographic system. The greater the degree of entropy, the stronger the cryptographic system. One possible component of a cryptographic system is a QRNG. A QRNG may leverage the random properties of quantum physics to generate a true source of entropy and thus improve quality of generated cryptographic materials, and thus improve the entire cryptographic system.

Network devices may require one or more QRNGs to augment entropy for a network. In one example, a QRNG may be attached to a main printed circuit board (PCB) of a network device, and may produce entropy for the network device. However, attaching the QRNG to the main PCB of the network device is costly and every user of the network device may not utilize the QRNG. In another example, the QRNG may be provided with a peripheral component interconnect express (PCIe) board capable of being utilized with a network device. However, the PCIe board is not suitable for in-field insertion in a security-related platform. In still another example, an entropy source (e.g., an entropy beacon equipped with an internal QRNG) may provide entropy traffic to network devices requiring such entropy. However, the entropy source creates a constant traffic load on the network device and requires maintenance associated with on-boarding and/or off-boarding network devices for receipt of the entropy traffic.

Thus, current techniques for providing entropy to network devices consume computing resources (e.g., processing resources, memory resources, communication resources, and/or the like), networking resources, and/or the like, associated with installing QRNGs on PCBs of network devices, inserting PCIe boards with QRNGs in network devices in the field, increasing a traffic load on the network device due to provision of entropy traffic, handling a decrease in network bandwidth associated with increasing the traffic load on the network, handling maintenance of network devices for receipt of the entropy traffic, and/or the like.

Some implementations described herein relate to a network device that utilizes a removable QRNG to generate entropy network traffic flows. For example, the removable QRNG of the network device may generate one or more packets with random payloads, and may provide the one or more packets with the random payloads to a component of the network device. The component of the network device may authenticate the random payloads of the one or more packets, and may cause the one or more packets with the random payloads to be forwarded to a destination address.

In this way, the network device utilizes a removable QRNG to generate entropy network traffic flows. For example, the network device may include a removable QRNG that generates packets with random number payloads (e.g., and wrapped in a higher level networking protocol, such as IP, MPLS, virtual local area network (VLAN), and/or the like). Each of the IP/MPLS packets may include an Ethernet header, an Ethernet address, a random payload, a time stamp for validity of the random payload, a cryptographic signature, and/or the like. The removable QRNG may provide the IP/MPLS packets to a packet forwarding component and/or a routing component RE of the network device. The removable QRNG may interface with network devices, in contrast to current QRNG implementations that are designed to interface with microprocessors and not networks or network devices. The removable QRNG enables entropy to become networkable and since routing components of network devices may terminate IP traffic, consuming the entropy produced by the removable QRNG is straight forward. Thus, the network device conserves computing resources, networking resources, and/or the like that would otherwise have been consumed by installing QRNGs on PCBs of network devices, inserting PCIe boards with QRNGs in network devices in the field, increasing a traffic load on the network device due to provision of entropy traffic, handling a decrease in network bandwidth associated with increasing the traffic load on the network, handling maintenance of network devices for receipt of the entropy traffic, and/or the like.

FIGS. 1A-1F are diagrams of an example 100 associated with utilizing a removable QRNG for a network device. As shown in FIGS. 1A-1F, example 100 includes one or more endpoint devices and a network with a plurality of network devices. Further details of the endpoint device, the network, and the network devices are provided elsewhere herein.

As shown in FIG. 1A, and by reference number 105, an endpoint device may communicate with another endpoint device via the network with the plurality of network devices. For example, the endpoint device may continuously communicate with the other endpoint device, may periodically communicate with the other endpoint device, may communicate with the other endpoint device based on requesting a communication from the other endpoint device, and/or the like.

As further shown in FIG. 1A, the network device may include a removable QRNG, a packet forwarding component, and a routing component. The removable QRNG may include a QRNG chip and a packetization module (e.g., a field-programmable gate array (FPGA)) that randomly and continuously generate keys that may be utilized as a source of entropy. The packetization module may utilize the keys with packets to generate entropy traffic, and may provide the entropy traffic to the packet forwarding component and/or the routing component. The QRNG chip of the removable QRNG may produce a constant stream of random numbers and the packetization module may generate valid IP/MPLS/ Ethernet packets with random payloads. An endpoint device may receive the entropy traffic generated by the removable QRNG. The removable QRNG may leverage the random properties of quantum physics to generate a true source of entropy and improve qualities of generated keys. The removable QRNG may also generate random numbers for certificate generation, key derivation, and/or the like. The removable QRNG may be removably mounted in the network device via a pluggable form factor, such as a small form-factor pluggable (SFP+), a quad small form-factor pluggable (QSFP), QSFP-double density (DD) module, and/ or the like.

The packet forwarding component may include one or more processors (e.g., application-specific integrated circuits (ASICs)) that perform Layer 2 and Layer 3 packet switching, route lookups, packet forwarding, and/or the like. The packet forwarding component may forward packets between input interfaces and output interfaces of the network device.

The routing component may control routing updates and system management associated with the network device. The routing component may include routing protocol software processes executed inside a protected memory environment on a general-purpose computer platform. The routing component may handle routing protocol processes and other software processes that control interfaces of the network device, some of chassis components of the network device, system management of the network device, and user access to the network device. The software processes may execute on top of a kernel that interacts with the packet forwarding component. Routing protocol packets from a network may be directed to the routing component, and therefore do not unnecessarily delay the packet forwarding component. The routing component may implement each routing protocol with a set of Internet protocol (IP) features and may provide full flexibility for advertising, filtering, and modifying routes. The routing component may set porting policies according to route parameters, such as prefix, prefix lengths, and border gateway protocol (BGP) attributes. The routing component may construct and maintain one or more routing tables. From the routing tables, the routing component may derive a table of active routes, called a forwarding table, which may be copied into the packet forwarding component. The forwarding table in the packet forwarding component may be updated without interrupting the network device's forwarding.

Figure 1B:
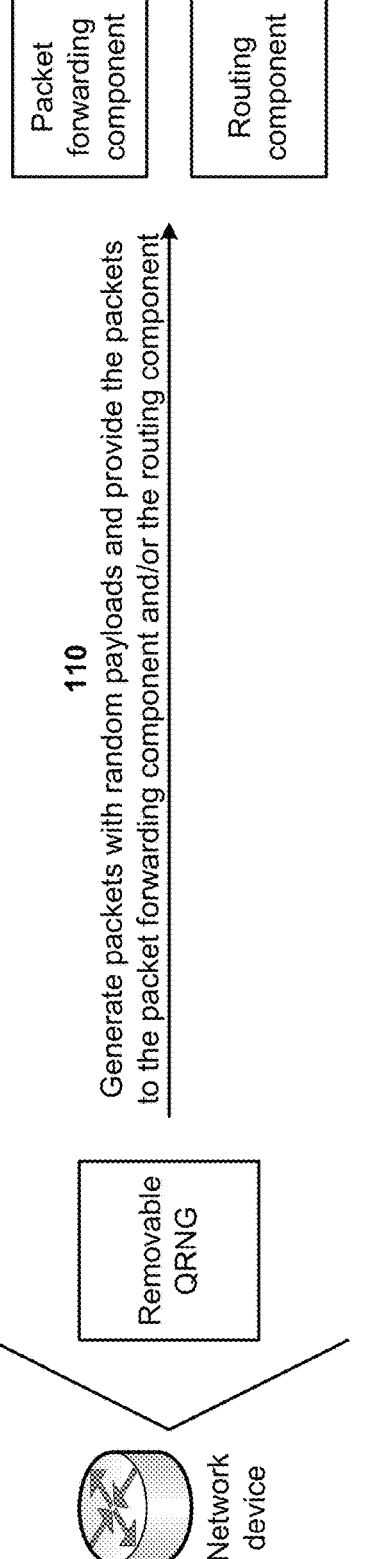

As shown in FIG. 1B, and by reference number 110, the removable QRNG of the network device may generate packets with random payloads and may provide the packets to the packet forwarding component and/or the routing component of the network device. For example, the removable QRNG may continuously generate valid Ethernet or IP/multiprotocol label switching (MPLS) packets with random payloads. In some implementations, each of the packets may include an Ethernet header, an Ethernet address, a payload of random numbers generated by the QRNG (e.g., with a particular length in bits), a time stamp indicating a validity time for the payload, and/or the like. In some implementations, the removable QRNG may generate the packets at a configured entropy generation rate and with particular packet sizes. In some implementations, the removable QRNG may include a clock or may receive a clock input (e.g., from the packet forwarding component and/or the routing component) that enables the QRNG to generate groups (e.g., bursts) of packets with random payloads at defined times, rather continuously generating a steady stream of packets. In some implementations, the QRNG may be configured to create greater randomness when greater entropy is required.

Several source addresses and/or destination addresses or a label stack (MPLS) may be programmed into the QRNG so that the network device may function as an entropy server for other network devices by producing distinct entropy flows (e.g., of packets) and routing the entropy flows to destination addresses. In some implementations, each of the packets may include a unicast address, a multicast address, a broadcast address, and/or the like. In some implementations, the QRNG may encrypt the random payloads (e.g., to prevent eavesdropping attempts) utilizing IP security (IPsec), media access control security (MACsec), transport layer security (TLS), and/or the like. The QRNG may include a trusted platform module (e.g., in lieu of or in addition to encryption) that prevents impersonation of the QRNG by a malicious device. The QRNG may analyze a quality of entropy generated by the packets and may notify the network device of entropy that fails to satisfy a quality threshold. In some implementations, the removable QRNG act as a traffic generator for load testing of hardware components of the network device and/or other network devices.

The removable QRNG may include a communication interface that communicates with the packet forwarding component and/or the routing component. The removable QRNG may utilize the communication interface to provide the packets to the packet forwarding component and/or the routing component of the network device. The packet forwarding component and/or the routing component may receive the packets from the removable QRNG, and may store the packets in a data structure (e.g., a database, a table, a list, and/or the like). In some implementations, the packet forwarding component may forward, to the routing component, packets that target the routing component. However, for management purposes (e.g., for fault, configuration, accounting, performance, and security (FCAPS) purposes), a controller of the network device may include a control interface to the removable QRNG that is possibly relayed by the packet forwarding component.

Figure 1C:
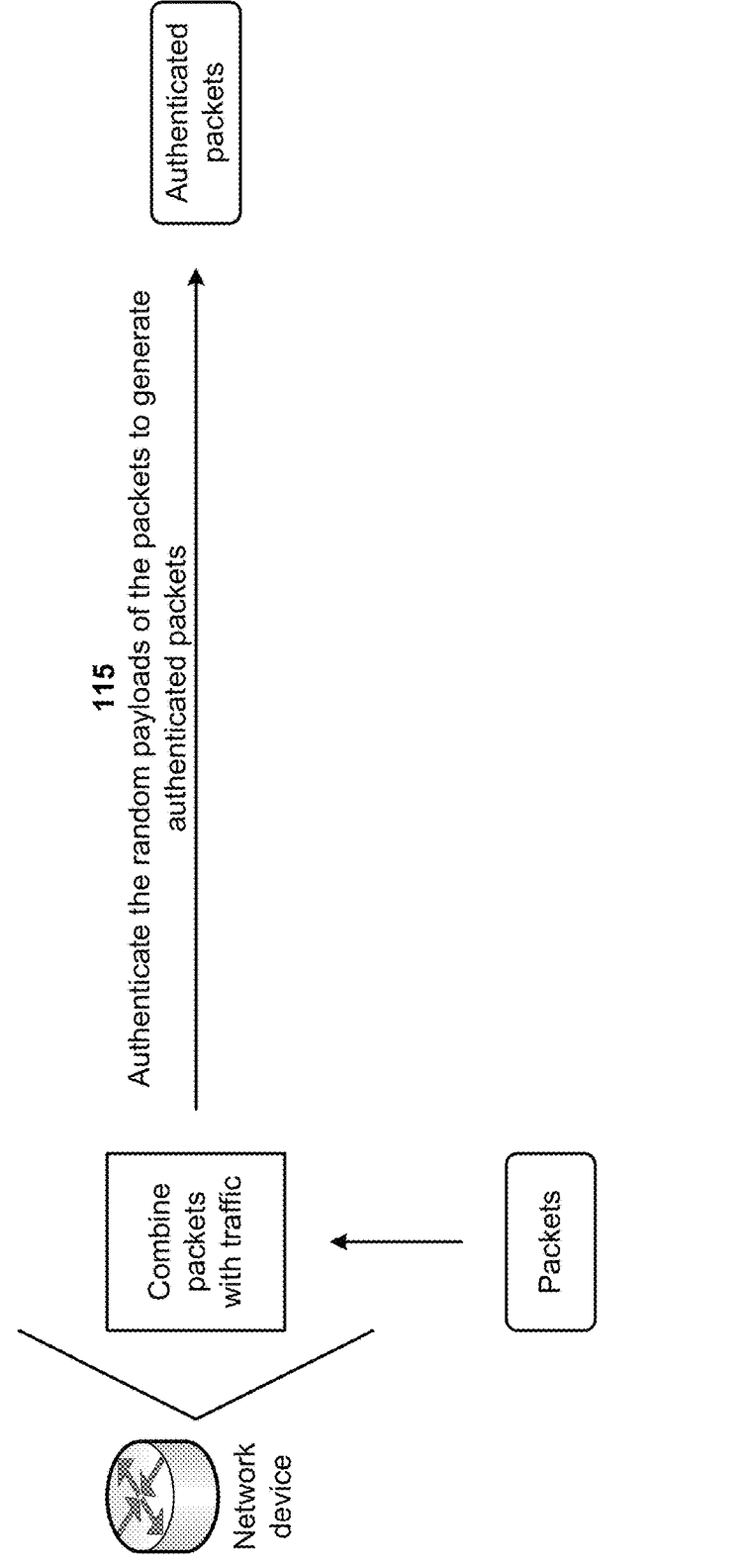

As shown in FIG. 1C, and by reference number 115, the network device may authenticate the random payloads of the packets to generate authenticated packets (e.g., entropy traffic). For example, the network device may include a hardware security module (e.g., provided on a printed circuit board (PCB) of the network device) that authenticates the random payloads of the packets generated by the removable QRNG. The hardware security module may safeguard and manage digital keys, may perform encryption and decryption functions for digital signatures, and may provide strong authentication and other cryptographic functions. The hardware security module may analyze entropy levels of the random payloads of the packets, and may authenticate the random payloads of the packets when the analysis indicates that the random payloads include sufficient entropy levels. Since the packets are provided to the packet forwarding component and/or the routing component, all of the capabilities of the packet forwarding component and/or the routing component may be utilized to condition the packets. For example, the packet forwarding component may rate limit, inspect, and/or route the packets as required.

Figure 1D:
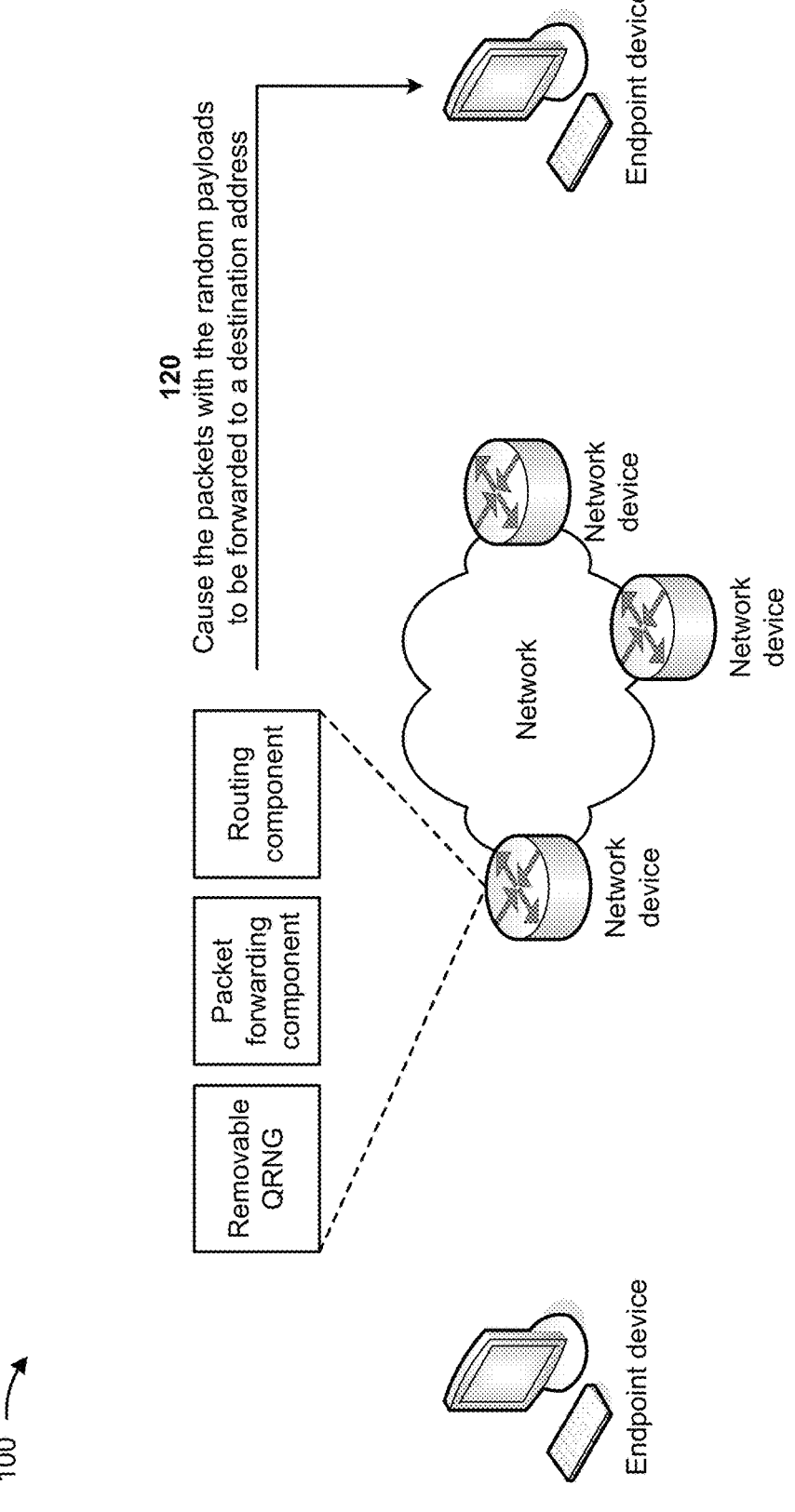

As shown in FIG. 1D, and by reference number 120, the packet forwarding component and/or the routing component of the network device may cause the packets with the random payloads to be forwarded to a destination address. For example, the packet forwarding component and/or the routing component may cause the packets with the random payloads to be forwarded to a destination address associated with an endpoint device. The packet forwarding component and/or the routing component may include the destination address in the packets with the random payloads and may provide the packets with the random payloads to one or more other network devices of the network. The other network devices may forward the packets with the random payloads to the destination address (e.g., the endpoint device) based on configuration or the destination address included in the packets with the random payloads. The endpoint device associated with the destination address may receive the packets with the random payloads.

Figure 1E:
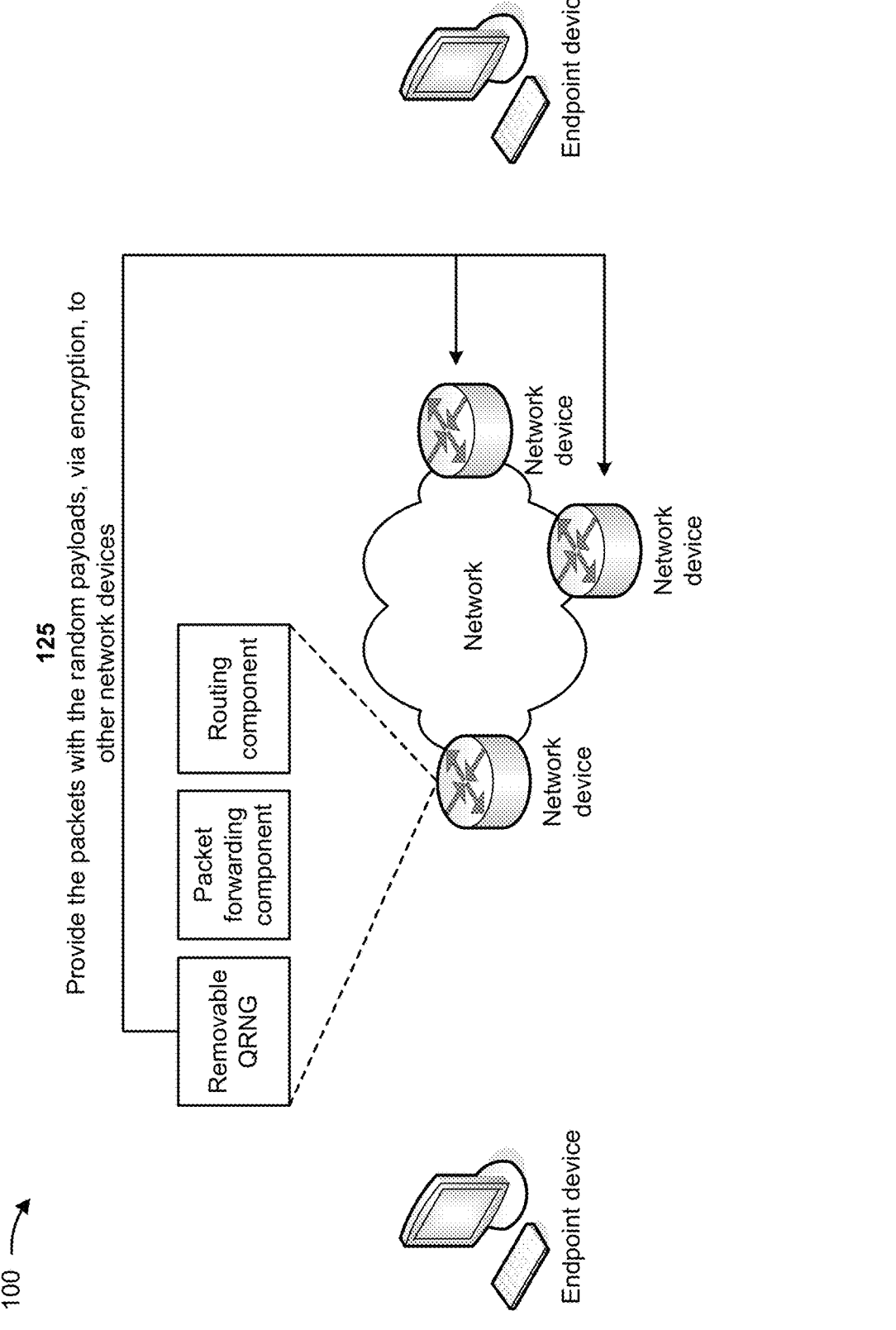

As shown in FIG. 1E, and by reference number 125, the packet forwarding component and/or the routing component of the network device may provide the packets with the random payloads, via encryption, to other network devices. For example, several source addresses and/or destination addresses or a label stack (MPLS) may be programmed into the QRNG so that the network device may function as an entropy server for other network devices by producing distinct entropy flows (e.g., of packets) and routing the entropy flows to destination addresses. In some implementations, the destination addresses may be associated with the other network devices requiring entropy, and the packet forwarding component and/or the routing component of the network device may provide the packets with the random payloads to the other network devices based on the destination addresses. In some implementations, the packets with the random payloads may be encrypted by the QRNG or encapsulated in an encrypted tunnel by the removable QRNG or the packet forwarding component prior to being provided to the other network devices.

Figure 1F:
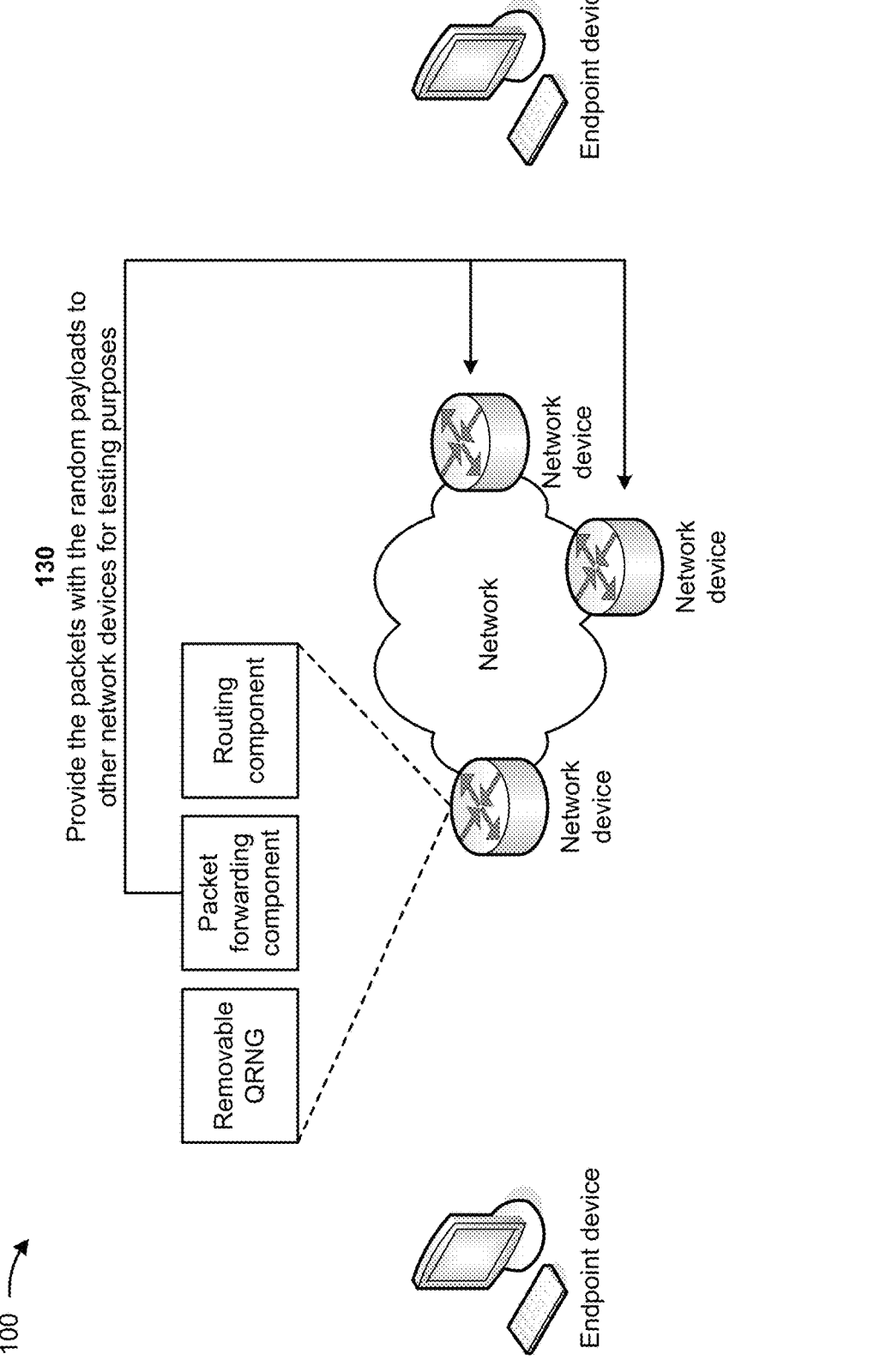

As shown in FIG. 1F, and by reference number 130, the packet forwarding component and/or the routing component of the network device may provide the packets with the random payloads to other network devices for testing purposes. For example, the removable QRNG may function as a traffic generator that utilizes the packets with the random payloads as test traffic. The packet forwarding component and/or the routing component of the network device may provide the packets with the random payloads, as test traffic, to other network devices so that the other network devices may utilize the packets with the random payloads for testing purposes.

In this way, the network device utilizes a removable QRNG to generate entropy network traffic flows. For example, the network device may include a removable QRNG that generates Ethernet or IP/MPLS packets with random number payloads. Each of the IP/MPLS packets may include an Ethernet header, an Ethernet address, a random payload, a time stamp for validity of the random payload, and/or the like. The removable QRNG may provide the IP/MPLS packets to a packet forwarding component and/or a routing component RE of the network device. The removable QRNG may interface with network devices, in contrast to current QRNG implementations that are designed to interface with microprocessors and not networks or network devices. The removable QRNG enables entropy to become networkable and since routing components of network devices may terminate IP traffic, consuming the entropy produced by the removable QRNG is straight forward. Thus, the network device conserves computing resources, networking resources, and/or the like that would otherwise have been consumed by installing QRNGs on PCBs of network devices, inserting PCIe boards with QRNGs in network devices in the field, increasing a traffic load on the network device due to provision of entropy traffic, handling a decrease in network bandwidth associated with increasing the traffic load on the network, handling maintenance of network devices for receipt of the entropy traffic, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
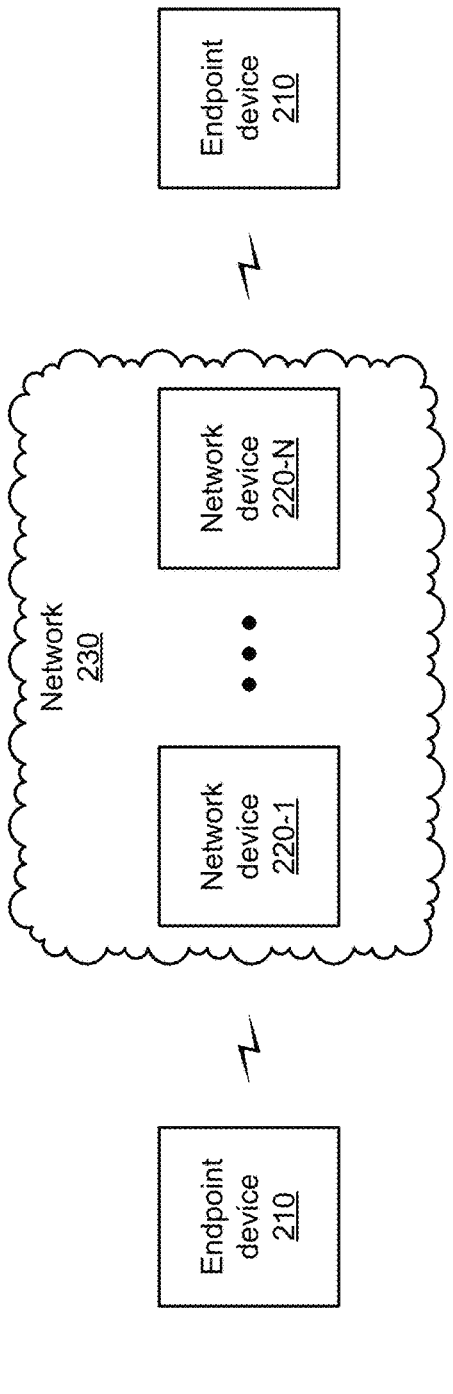
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210, via the network 230 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
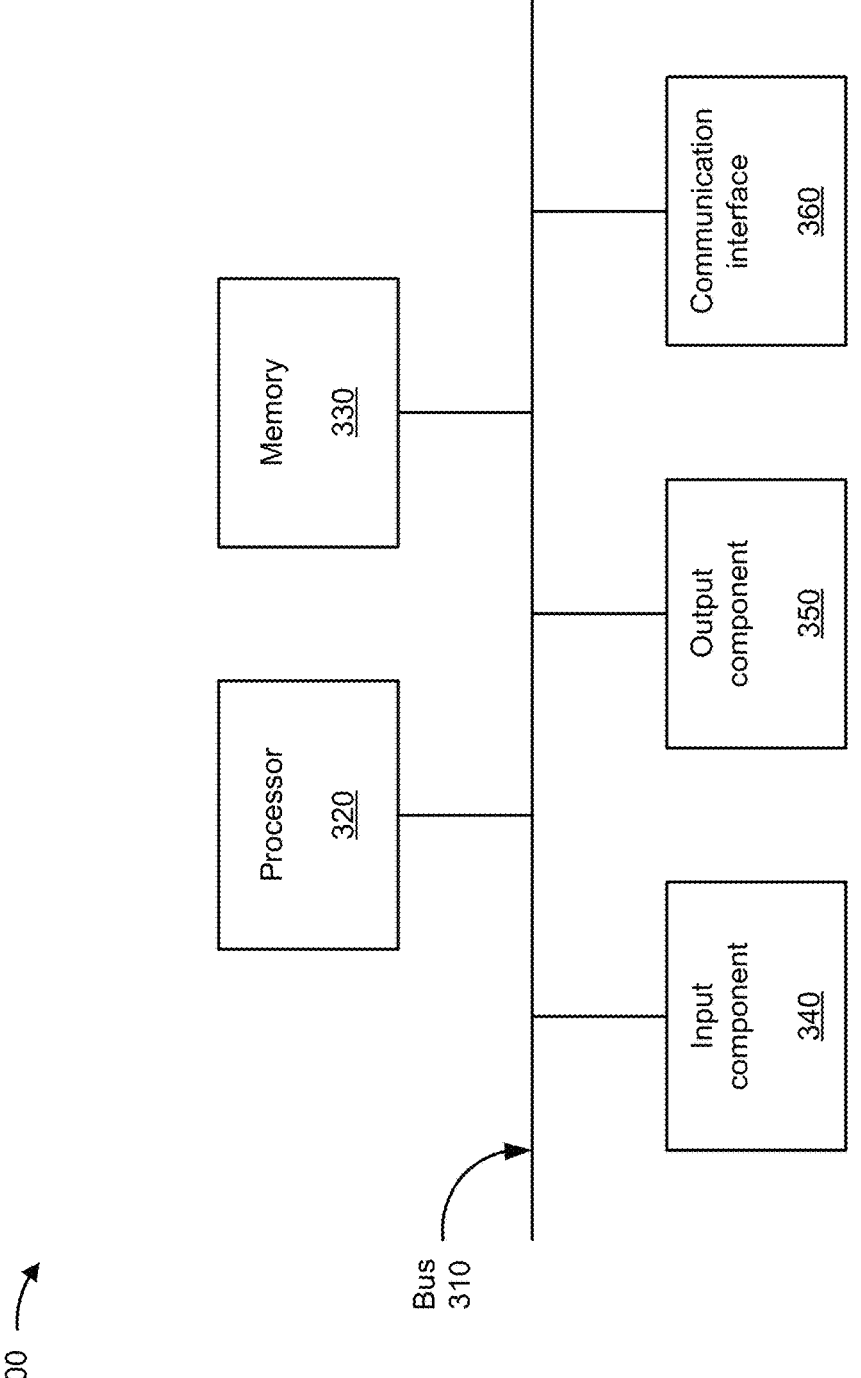
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, an actuator, the removable QRNG, and/or the like. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
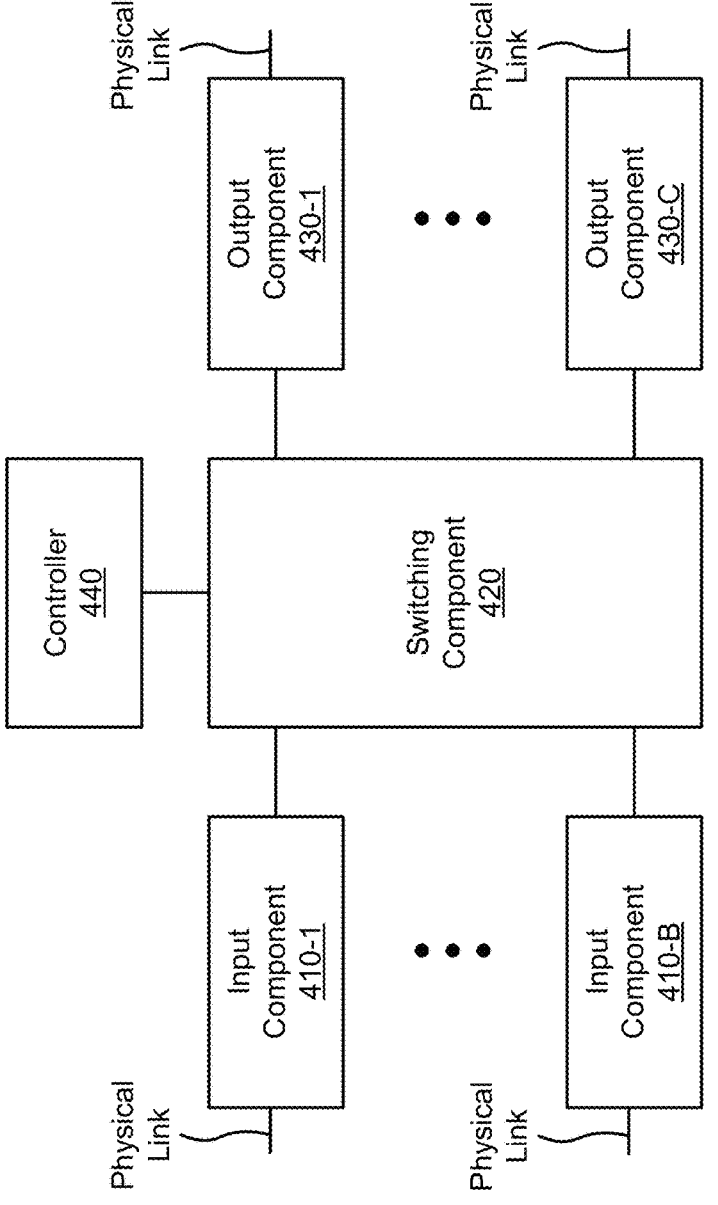

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
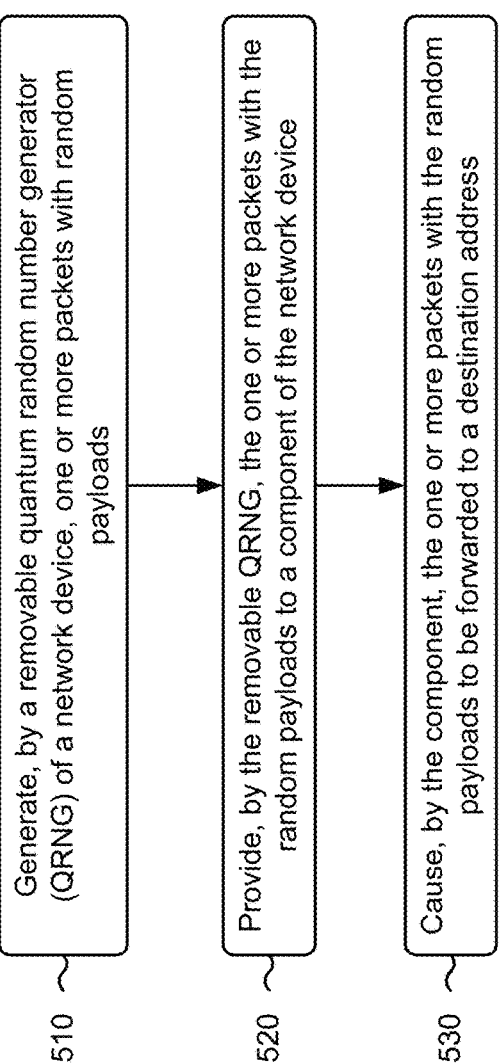
FIG. 5 is a flowchart of an example process for utilizing a removable QRNG for a network device.

FIG. 5 is a flowchart of an example process 500 for utilizing a removable QRNG for a network device. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include generating, by a removable QRNG of the network device, one or more packets with random payloads (block 510). For example, the network device may generate, by a removable QRNG of the network device, one or more packets with random payloads, as described above. In some implementations, each of the one or more packets includes one or more of an Ethernet header, an Ethernet address, a payload of random numbers generated by the removable QRNG, or a time stamp indicating a validity time for the payload. In some implementations, each of the one or more packets is an IP packet or an MPLS packet. In some implementations, generating the one or more packets with the random payloads includes generating the one or more packets with the random payloads at a steady rate, or generating the one or more packets with the random payloads at defined times. In some implementations, each of the one or more packets with the random payloads includes a unicast address, a multicast address, or a broadcast address. In some implementations, the removable QRNG includes a cryptographic module.

As further shown in FIG. 5, process 500 may include providing, by the removable QRNG, the one or more packets with the random payloads to a component of the network device (block 520). For example, the network device may provide, by the removable QRNG, the one or more packets with the random payloads to a component of the network device, as described above. In some implementations, the component is one of a packet forwarding component or a routing component of the network device.

As further shown in FIG. 5, process 500 may include causing, by the component, the one or more packets with the random payloads to be forwarded to a destination address (block 530). For example, the network device may cause, by the component, the one or more packets with the random payloads to be forwarded to a destination address, as described above.

In some implementations, process 500 includes authenticating the random payloads of the one or more packets prior to causing the one or more packets with the random payloads to be forwarded to the destination address. In some implementations, process 500 includes encrypting the one or more packets with the random payloads to generate one or more encrypted packets, and providing the one or more encrypted packets to one or more other network devices. In some implementations, process 500 includes causing, by the component of the network device, the one or more packets with the random payloads to be forwarded to one or more other network devices for testing purposes.

In some implementations, process 500 includes inspecting the one or more packets with the random payloads, identifying one or more routes to one or more other network devices based on inspecting the one or more packets, and providing the one or more packets with the random payloads to the one or more other network devices via the one or more routes. In some implementations, process 500 includes determining a rate at which to provide the one or more packets with the random payloads to one or more other network devices, and providing the one or more packets with the random payloads to the one or more other network devices based on the rate. In some implementations, process 500 includes determining an entropy quality associated with the one or more packets, and generating a notification indicating the entropy quality associated with the one or more packets.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
generating, by a removable quantum random number generator (QRNG) of a network device, one or more packets with random payloads based on a received clock input at a defined time,
wherein each of the one or more packets includes a payload of random numbers generated by the removable QRNG and a time stamp indicating a validity time for the payload,
wherein the QRNG produces entropy for a network traffic flow by generating the one or more packets with the random payloads, and
wherein the QRNG is configured to create greater randomness when greater entropy is required;
providing, by the network device, the one or more packets with the random payloads to a component of the network device;
authenticating, by the network device, the random payloads of the one or more packets with the random payloads prior to causing the one or more packets with the random payloads to be forwarded to a destination address;
causing, by the component of the network device, the one or more packets with the random payloads to be forwarded to the destination address; and
providing, by the removable QRNG, the one or more packets with the random payloads to one or more other network devices via encryption.

2. The method of claim 1,
wherein the component is one of a packet forwarding component or a routing component of the network device.

3. The method of claim 1, further comprising:
causing, by the component of the network device, the one or more packets with the random payloads to be forwarded to the one or more other network devices for testing purposes.

4. The method of claim 1,
wherein each of the one or more packets with the random payloads includes one or more of:
an Ethernet header, or
an Ethernet address.

5. The method of claim 1,
wherein each of the one or more packets with the random payloads is an Internet protocol packet or a multiprotocol label switching packet.

6. The method of claim 1,
wherein a destination address, associated with the one or more other network devices requires entropy, and
wherein the network device provides the one or more packets with the random payloads to the one or more other network devices based on the destination addresses.

7. The method of claim 1, further comprising:
inspecting the one or more packets with the random payloads; and
identifying one or more routes to the one or more other network devices based on inspecting the one or more packets with the random payloads.

8. A network device, comprising:
a removable quantum random number generator (QRNG);
one or more memories; and
one or more processors to:
generate, by the removable QRNG, one or more packets with random payloads based on a clock input at a defined time,
wherein each of the one or more packets with the random payloads includes a payload of random numbers generated by the removable QRNG and a time stamp indicating a validity time for the payload,
wherein the QRNG produces entropy for a network traffic flow by generating the one or more packets with the random payloads, and
wherein the QRNG is configured to create greater randomness when greater entropy is required;
provide, by the removable QRNG, the one or more packets with the random payloads to a component of the network device;
authenticate the random payloads of the one or more packets with the random payloads prior to causing the one or more packets with the random payloads to be forwarded to a destination address;
cause the one or more packets with the random payloads to be forwarded to the destination address; and
provide, by the removable QRNG, the one or more packets with the random payloads to one or more other network devices via encryption.

9. The network device of claim 8,
wherein the one or more processors are further to:
inspect the one or more packets with the random payloads; and
identify one or more routes to the one or more other network devices based on inspecting the one or more packets with the random payloads.

10. The network device of claim 8, wherein the one or more processors are further to:
determine a rate at which to provide the one or more packets with the random payloads to the one or more other network devices; and
provide the one or more packets with the random payloads to the one or more other network devices based on the rate.

11. The network device of claim 8,
wherein the one or more processors, to generate the one or more packets with the random payloads, are to one of:
generate the one or more packets with the random payloads at a steady rate; or generate the one or more packets with the random payloads at defined times.

12. The network device of claim 8,
wherein each of the one or more packets with the random payloads includes a unicast address, a multicast address, or a broadcast address.

13. The network device of claim 8,
wherein the removable QRNG includes a cryptographic module.

14. The network device of claim 8, wherein the one or more processors are further to:
determine an entropy quality associated with the one or more packets with the random payloads; and
generate a notification indicating the entropy quality associated with the one or more packets with the random payloads.

15. A non-transitory computer-readable medium storing a set of instructions, the set of instructions comprising:

one or more instructions that, when executed by one or more processors of a network device, cause the network device to:

generate, by a removable quantum random number generator (QRNG) of the network device, one or more packets with random payloads based on a clock input, wherein each of the one or more packets with the random payloads includes a payload of random numbers generated by the removable QRNG and a time stamp indicating a validity time for the payload, wherein the QRNG produces entropy for a network traffic flow by generating the one or more packets with the random payloads, and wherein the QRNG is configured to create greater randomness when greater entropy is required;

provide, by the removable QRNG, the one or more packets with the random payloads to a component of the network device;

authenticate the random payloads of the one or more packets with the random payloads;

cause the one or more packets with the random payloads to be forwarded to a destination address; and provide, by the removable QRNG, the one or more packets with the random payloads to one or more other network devices via encryption.

16. The non-transitory computer-readable medium of claim 15, wherein the one or more instructions, to provide the one or more packets with the random payloads, cause the network device to:

provide the one or more packets with the random payloads to the one or more other network devices for testing purposes.

17. The non-transitory computer-readable medium of claim 15, wherein the one or more instructions further cause the network device to:

inspect the one or more packets with the random payloads;

identify one or more routes to the one or more other network devices based on inspecting the one or more packets with the random payloads; and provide the one or more packets with the random payloads to the one or more other network devices via the one or more routes.

18. The non-transitory computer-readable medium of claim 15, wherein the one or more instructions further cause the network device to:

determine a rate at which to provide the one or more packets with the random payloads to the one or more other network devices; and provide the one or more packets with the random payloads to the one or more other network devices based on the rate.

19. The non-transitory computer-readable medium of claim 15, wherein the one or more instructions further cause the network device to:

determine an entropy quality associated with the one or more packets with the random payloads; and generate a notification indicating the entropy quality associated with the one or more packets with the random payloads.

20. The non-transitory computer-readable medium of claim 15, wherein a destination address, associated with the one or more other network devices requires entropy, and wherein the network device provides the one or more packets with the random payloads to the one or more other network devices based on the destination addresses.

\* \* \* \* \*